United States Patent [19]
Chang

[11] Patent Number: 5,746,117
[45] Date of Patent: May 5, 1998

[54] DEEP FRYER

[75] Inventor: Li-Chen Chang, Taoyuan, Taiwan

[73] Assignee: Lyu Jan Co., Ltd., Taiwan

[21] Appl. No.: 839,920

[22] Filed: Apr. 21, 1997

[51] Int. Cl.$^6$ .............. A47J 37/00; A47J 37/10; A47J 37/12
[52] U.S. Cl. .............. 99/407; 99/411; 99/413; 99/415
[58] Field of Search .............. 99/330, 334–336, 99/403–418; 210/167, DIG. 8; 126/391, 350 R; 426/438, 445

[56] References Cited

U.S. PATENT DOCUMENTS

| | | | |
|---|---|---|---|
| 3,718,485 | 2/1973 | Lankford | 426/438 |
| 3,731,614 | 5/1973 | Smith et al. | 99/404 |
| 3,799,048 | 3/1974 | Finley | 99/415 |
| 3,908,534 | 9/1975 | Martin | 99/418 |
| 4,542,685 | 9/1985 | Wilson | 99/413 |
| 4,574,776 | 3/1986 | Hidle | 99/413 |
| 4,580,549 | 4/1986 | Sato | 126/391 |
| 4,793,324 | 12/1988 | Caferro | 99/415 X |
| 5,033,369 | 7/1991 | Wu | 99/408 |
| 5,195,424 | 3/1993 | Guajaca | 99/418 |
| 5,323,693 | 6/1994 | Collard et al. | 99/415 X |
| 5,379,684 | 1/1995 | Ettridge | 99/336 |
| 5,431,092 | 7/1995 | Guillory | 99/410 |

Primary Examiner—Timothy F. Simone
Attorney, Agent, or Firm—Meltzer, Lippe, Goldstein et al.

[57] ABSTRACT

A deep fryer includes a fryer body containing therein frying oil and a basket movably received within the body to be lifted/lowered down. An L-shaped base member is fixed on top rim of the fryer body, having a vertical section received within the body and a horizontal section extending out of the body to which a handle is pivoted so that the handle is rotatable between a horizontal position and a vertical position. Two U-shaped members are provided, each having a central section rotatably supported on the vertical section of the base member and two legs rotatably attached to and accommodating the basket therebetween. A link received inside and pivoted to the horizontal section of the base member having a first end connected to an arm of the first U-shaped member and a second end opposite to the first end and movably received an arc slot formed on the handle so that by rotating the handle relative to the base member the U-shaped member is driven via the link to lift/lower down the basket within the fryer.

6 Claims, 4 Drawing Sheets

DEEP FRYER

FIELD OF THE INVENTION

The present invention relates generally to a deep fryer and in particular to a deep fryer having a basket lifting and holding mechanism associated with a handle of the fryer so as facilitate the control of the location of the basket with respect to the deep fryer.

BACKGROUND OF THE INVENTION

Fryers are a cooking device for using oil to fry foods. Conventionally, a fryer comprises a container for receiving and heating therein frying oil and food is placed into the hot frying oil to be fried. A separate net or a holed ladle or a basket is needed to pick up the fried food. Using such a separate basket to pick up food from the hot oil is not convenient for the food may not be completely collected at one picking up operation and several picking up operations are required to completely pick up the fried food. Since a time delay between the several times of picking up operation, some of the food that is picked up later may get over-fried.

To overcome such a problem, a basket is provided inside the fryer for receiving the food to be fried therein and is selectively removable out of the fryer to move the fried food out of the fryer. This ensures that the food is all fried to substantially the same extent. The basket is provided with a handle for manually removing the basket out of the fryer. However, using a hand to hold the basket handle for lifting the basket out of the fryer is quite dangerous for the basket may be quite heavy so that it may not be possible for an operator to firmly hold the basket with one or event two hands. Further, during the lifting movement of the basket, there may still be hot oil drips spilled out of the fryer and the basket to burn the operator's hand.

Thus, it is desirable to provide a deep fryer having a basket control mechanism which helps lifting the basket out of the hot oil and firmly holding the basket when it is lifted out of the oil so as to overcome the drawbacks of the prior art fryers.

SUMMARY OF THE INVENTION

The principal object of the present invention is to provide a deep fryer having a basket movably received therein, a handle being provided to control the location of the basket within the fryer by means of a control mechanism so as to allow the basket to be firmly retained within or out of the frying oil contained in the fryer.

Thus, in accordance with the present invention, there is provided a deep fryer comprising a fryer body containing therein frying oil and a basket movably received within the body to be lifted/lowered down. An L-shaped base member is fixed on top rim of the fryer body, having a vertical section received within the body and a horizontal section extending out of the body to which a handle is pivoted so that the handle is rotatable between a horizontal position and a vertical position. Two U-shaped members are provided, each having a central section rotatably supported on the vertical section of the base member and two legs rotatably attached to and accommodating the basket therebetween. A link received inside and pivoted to the horizontal section of the base member having a first end connected to an arm of the first U-shaped member and a second end opposite to the first end and movably received an arc slot formed on the handle so that by rotating the handle relative to the base member the U-shaped member is driven via the link to lift/lower down the basket within the fryer.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
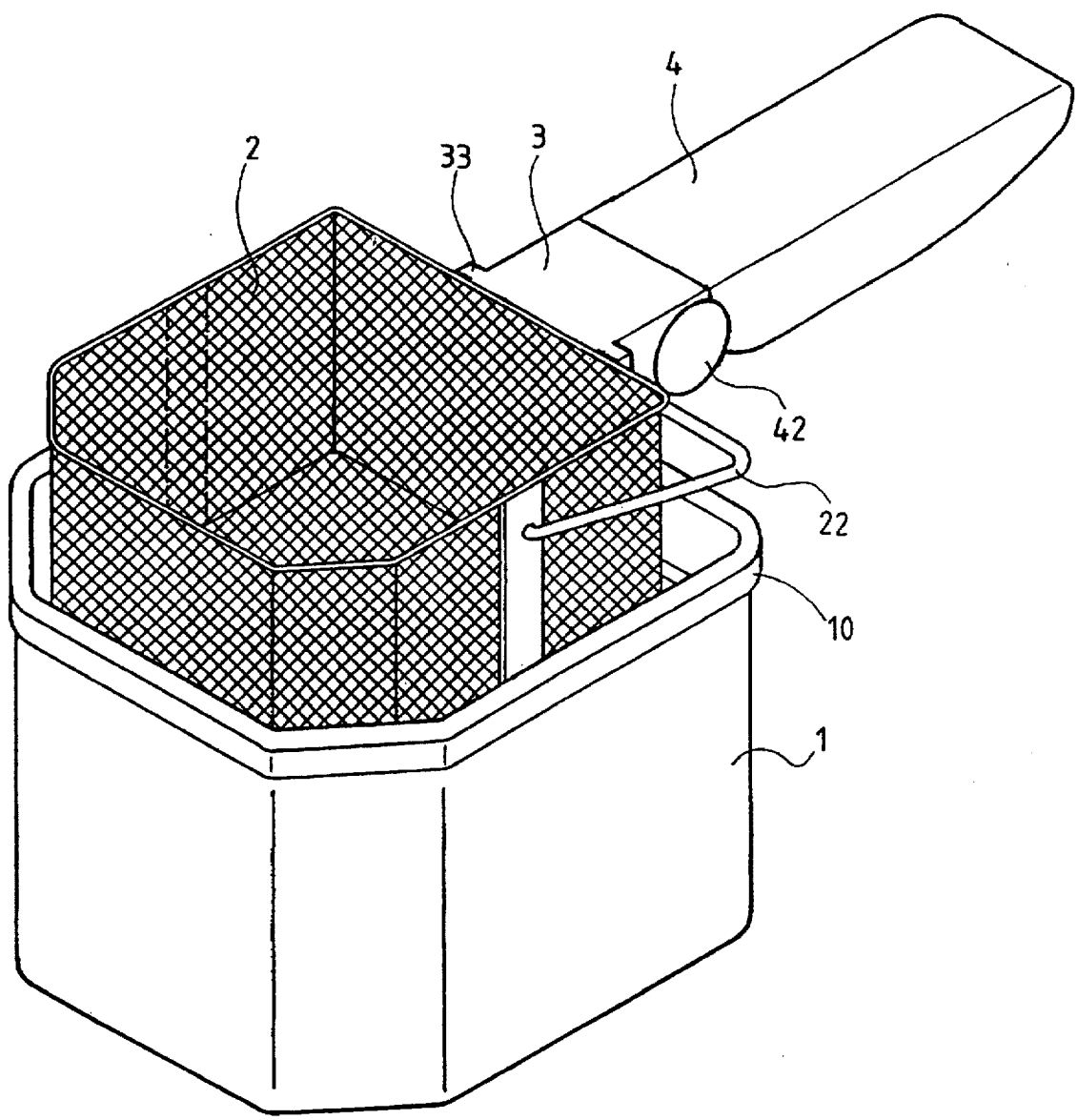
FIG. 1 is a perspective view showing a deep fryer constructed in accordance with the present invention.

With reference to the drawings and in particular to FIG. 1, which shows a deep fryer constructed in accordance with the present invention, the deep fryer of the present invention comprises a fryer body 1 which is a container, preferably made of stainless steel, for containing therein frying oil (not shown) having a top opening defined by a circumferential top rim 10 for receiving a basket 2 therethrough. The basket 2 is preferably also made of stainless steel. The basket 2 is provided with a handle 4 which is rotatable with respect to the basket 2. A basket control mechanism is provided between the handle 4 and the basket 2 so that by the rotation of the handle 4, the basket 2 is moved between a lifted position, FIG. 3, and a lowered position, FIG. 4.

Figure 2:
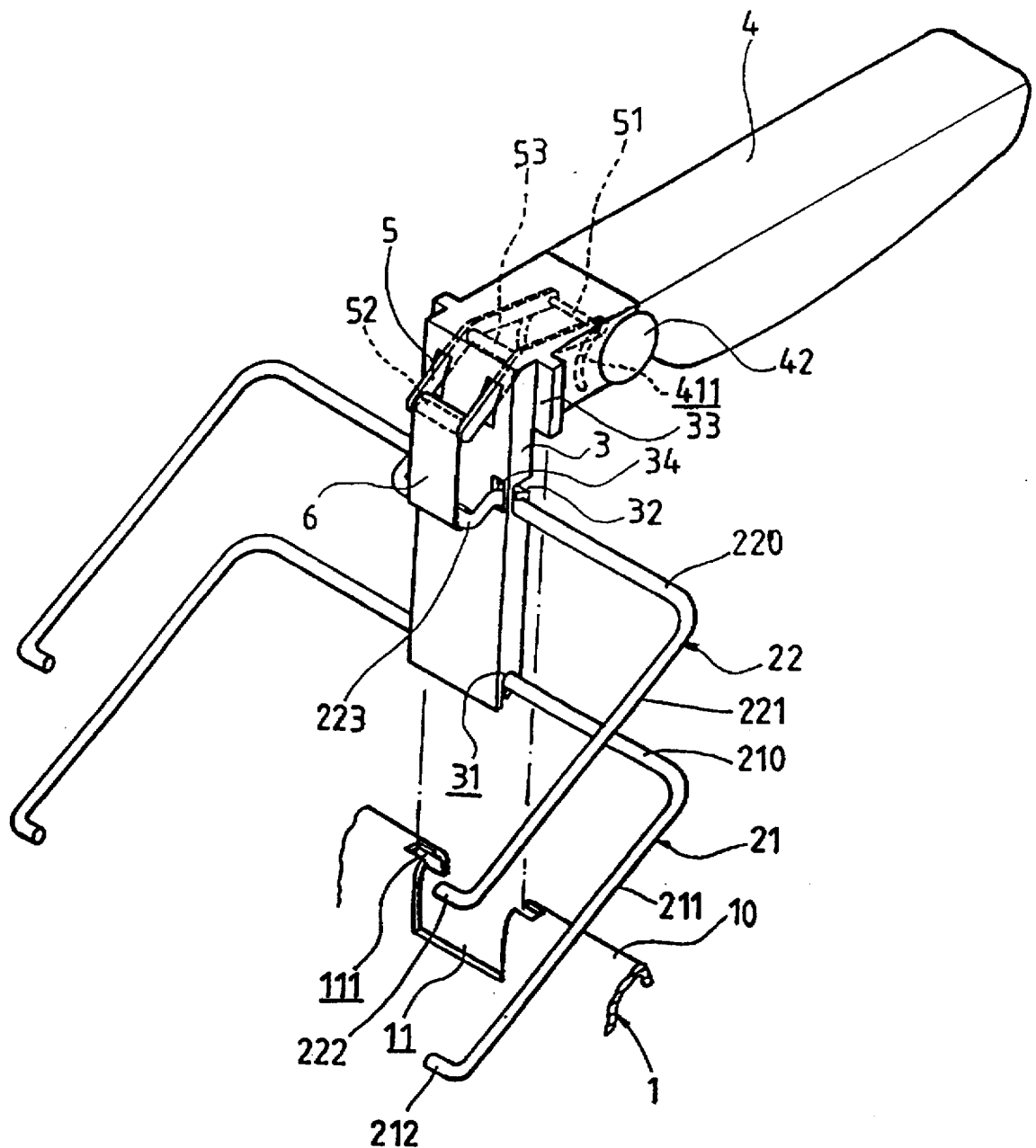
FIG. 2 is a perspective view showing the basket control mechanism of the deep fryer of the present invention.

With reference to FIG. 2, the basket control mechanism in accordance with the present invention comprises a base member 3 which is L-shaped having a first branch received into the fryer body 1 in a substantially vertical direction and a second branch disposed within a recess 11 formed on the top rim of the body 1 and extending out of the fryer body 1 therefrom in a substantially horizontal direction. Preferably, the base member 3 and especially the second branch thereof has a width substantially corresponding to the width of the recess 11.

The second brand of the base member 3 comprises two spaced and opposite side walls between which an inner end portion of the handle 4 is received and pivoted thereto at 42 so as to allow the handle 4 to be rotatable with respect to the second branch of the base member 3 between a first (vertical) position where the handle 4 is substantially normal to the second branch of the base member 3 and is located close to the fryer body 1 and a second (horizontal) position where the handle 4 is substantially in alignment with the second branch of the base member 3. The inner end portion of the handle 4 is preferably constituted by two spaced walls 41 on each of which an arc slot 411 is formed to be in alignment with each other. The arc slots 411 will be further described.

To more securely hold the base member 3 within the recess 11, the top rim 10 is provided with two slots 111 extending from the recess 11 and along a portion of the top rim 10 in oppositely directions. Corresponding to the slots 111, the base member 3 is provided with two lugs 33 receivable within the slots 111 so as to more securely hold the base member 3 on the fryer body 1.

The basket control mechanism further comprises a lower U-shaped bar member 21 and an upper U-shaped bar member 22 which are rotatably supported on the first branch of the base member 3 and spaced from each other along the first branch of the base member 3 at a suitable distance. Each of the U-shaped bar members 21 and 22 comprises a central section 210 or 220 rotatably supported on the first branch of the base member 3 respectively at 31 and 32 and two leg sections 211 or 221 extending therefrom toward the basket 2 and preferably substantially normal to the central section 210 or 220 to define therebetween a space sufficient to accommodate the basket 2. Each of the leg sections 211 or 221 of each of the U-shaped bar members 21 and 22 has an inward extension 212 or 222 which are opposite to and in alignment with each other so as to define a pivotal axis.

The inward extensions 212 and 222 are rotatably received within holes formed on two opposite sides of the basket 2 to rotatably support the basket 2 thereon. The spacing between the central section 220 of the upper bar member 22 and the central section 210 of the lower bar member 21 along the first branch of the base member 3 is preferably substantially corresponding to the distance between the holes formed on the basket 2 into which the inward extensions 222 and 212 of the upper and lower bar members 22 and 21 are received so as to define a parallelogram which allows the basket 2 to be rotated relative to the leg sections 221 and 211 of the two bar members 22 and 21 in a very smooth manner and thus as illustrated in the embodiment discussed herein, as the first branch of the base member 3 is arranged to be substantially vertical, the basket 2 is movable in a substantially vertical manner without being inclined with respect to fryer body 1, namely the movement of the basket 2 between the lifted position and the lowered position is substantially pure translation without rotation.

The central section 222 of the upper bar member 22 comprises a substantially U-shaped notch 223 which is preferably centered on the central section 222 and extending toward the basket 2 to be spaced from the central section 222 a predetermined distance serving as an arm of force of a lever system defined by the upper U-shaped bar member 22 wherein the leg sections 221 of the upper bar member 22 serves as an opposite arm of force for supporting the basket 2.

The basket control mechanism comprises driving means coupled between the inner end portion of the handle 4 that is received within the second branch of the base member 3 and the U-shaped notch 223 of the upper bar member 22 so that by rotating the handle 4 relative to the base member 3 between the first position and the second position, the driving means moves the basket 2 relative to the fryer body 1 via the upper bar member 22 between the lowered position and the lifted position.

Figure 3:
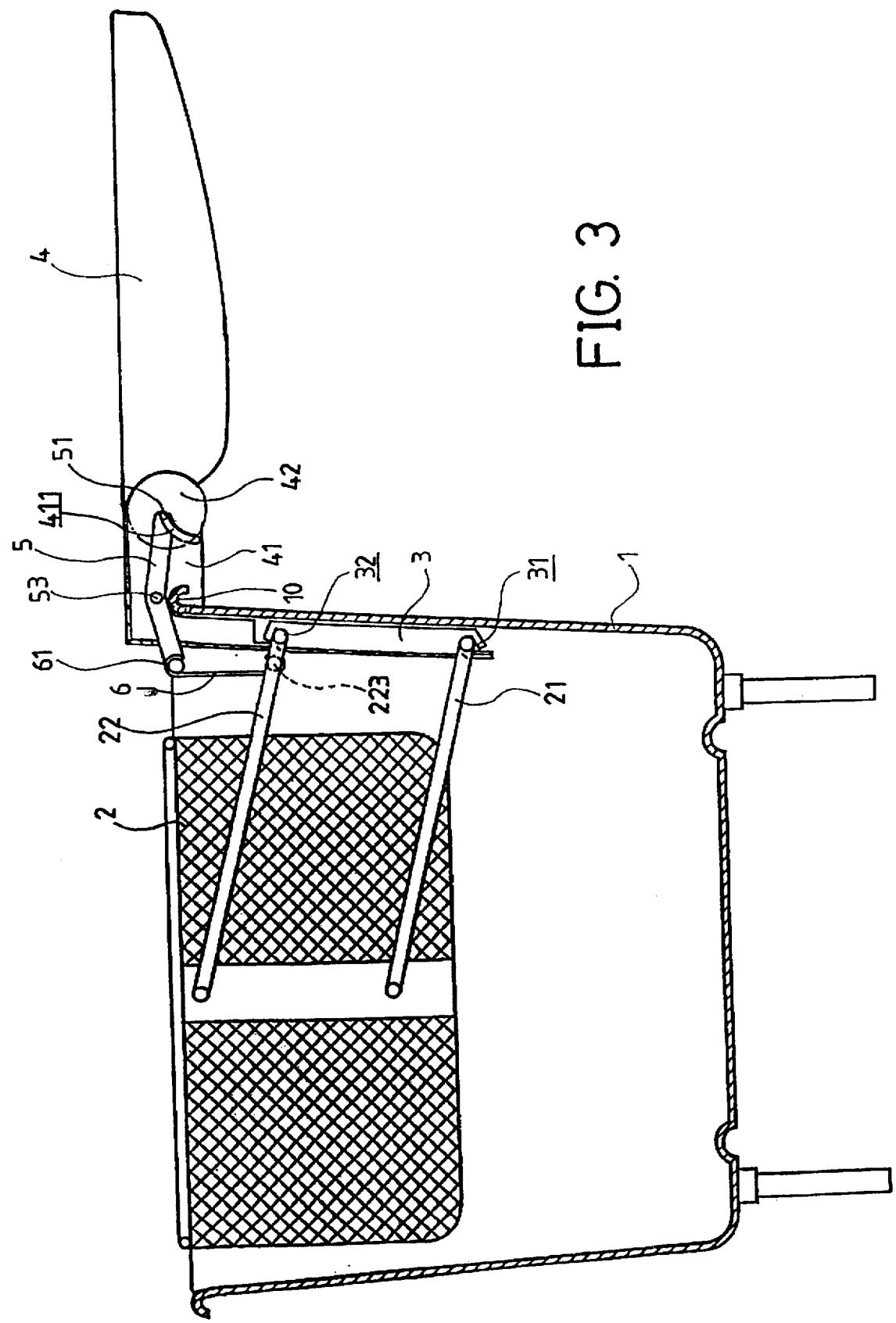
FIGS. 3 and 4 are cross-sectional views showing different operation conditions of the basket control mechanism in cooperation with the movement of the basket handle.
Figure 4:
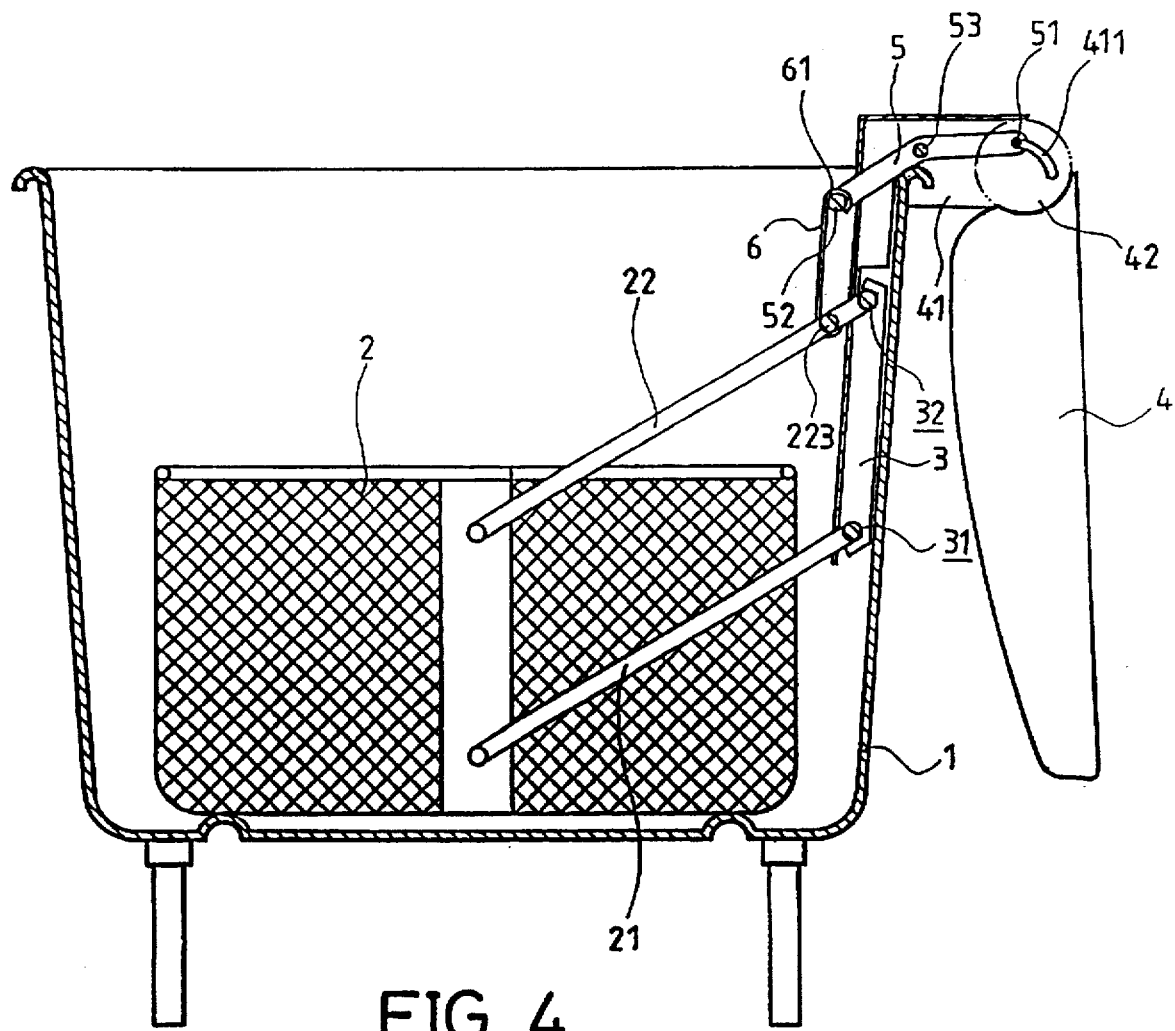

With reference to FIGS. 2–4, the driving means comprises a link member 5 which is disposed inside the second branch of the base member 3 and pivoted thereto at 53. The link member 5 comprises a first section extending toward the basket 2 and having a remote end 52 connected to the notch 223 of the central section 220 of the upper bar member 22 by means of a connection member 6 and a second section extending away from the basket 2 and having an end pin 51 movably received within and guided by the arc slots 411 of the side walls 41 of the handle 4.

As shown in FIGS. 3 and 4, the arc slots 411 is configured to have a first end and an opposite second end so that when the handle 4 is rotated from the first position, see FIG. 4, where the end pin 51 of the link member 5 is located at the first end of the arc slots 411, in a first direction toward the second position, see FIG. 3, the arc slots 411 are moved relative to the end pin 51 to have the end pin 51 located at and in contact engagement with the second end of the arc slots 411. A further movement of the handle 4 in the first direction causes the arc slots 411 to drive the end pin 51 of the link member 5 to rotate downward with respect to the pivot 53 due to the contact engagement thereof with the arc slots 411. Such a downward movement of the link member 5 with respect to the pivot 53 causes the remote end 52 of the first section of the link member 5 to move upward relative to the pivot 53 so as to drive the notch 223 of the central section 220 of the upper bar member 22 via the connection 6 to lift the basket 2 upward as shown in FIG. 3.

Rotating the handle 4 in a second direction opposite to the first direction from the second position to the first position causes the arc slots 411 to move relative to the end pin 51 and eventually locate the end pin 51 at the second end of the arc slots 411 to be in contact engagement therewith. A further movement of the handle 4 in the second direction causes the end pins 51 to move upward relative to the pivot 53 due to the contact engagement between the end pin 51 and the arc slots 411. The upward movement of the end pin 51 causes the remote end 52 of the first section of the link member 5 to move downward which in turn drives the upper bar 22 to lower down the basket 2 via the connection member 6 and the notch 223 of the upper bar 22, as shown in FIG. 4.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A deep fryer structure comprising a container-like body for containing frying oil, having a top opening defined by a top rim, and a basket movably received within the body through the top opening thereof, basket control means being provided to move the basket relative to the body between a lifted position and a lowered position, the basket control means comprising an L-shaped base member having a vertical section received into the body and a horizontal section received within a recess formed on the top rim of the body and extending outward therefrom, the horizontal section of the base member defining an interior channel into which an end of a handle is received and pivoted thereto to allow the handle to be rotatable with respect to the base member between a vertical position where the handle is substantially normal to the horizontal section of the base member and a horizontal position where the handle is substantially in alignment with the horizontal section of the base member, a U-shaped bar having a central section rotatably supported on the vertical section of the base member with two leg sections extending therefrom and spaced from each other to accommodate the basket therebetween in a relatively rotatably manner, the U-shaped bar further comprising an arm extending from the central section thereof and configured to allow the U-shaped bar to be rotated by rotating the arm relative to the central section, the arm being mechanically coupled to the handle so that by forcing the handle from the vertical position to the horizontal position, the arm is moved in a first direction to rotate the U-shaped bar in a lifting direction to have the leg sections thereof to move the basket from the lowered position to the lifted position and by forcing the handle from the horizontal position to the vertical position, the arm is moved in a second opposite direction to rotate the U-shaped bar in a lowering direction to have the leg sections thereof to move the basket from the lifted position to the lowered position.

2. The deep fryer structure as claimed in claim 1, wherein the mechanical coupling between the U-shaped bar and the handle comprises a link disposed within and pivoted to the interior channel of the horizontal section of the base member, having an inner section extending toward the basket with a remote inner end connected to a free end of the arm of the U-shaped member so that by rotating the link about the pivot, the arm is driven to rotate the U-shaped bar by means of the connection with the remote inner end of the link and an outer section extending opposite to the inner section and having an end pin movably received within an arc slot formed on the inner end of the handle, the arc slot being configured so that when the handle in the vertical position, the end pin is located at a first end of the arc slot and when the handle is moved from the vertical position to the horizontal position, the arc slot is moved relative to the end pin to have the end pin positioned at and in contact engagement with a second end of the arc slot, a further movement of the handle forcing the end pin to drive the link to rotate about the pivot and have the U-shaped member move in the lifting direction, and when the handle is moved from the horizontal position to the vertical position, the arc slot is moved relative to the end pin to have the end pin positioned at and in contact engagement with the first end of the arc slot, a further movement of the handle forcing the end pin to drive the link to rotate about the pivot and have the U-shaped member move in the lowering direction.

3. The deep fryer structure as claimed in claim 1, further comprising a second U-shaped member having a central section rotatably supported on the vertical section of the base member and spaced from the U-shaped member that is coupled to the handle and two leg sections extending from the central section thereof and spaced from each other for accommodating the basket therebetween.

4. The deep fryer structure as claimed in claim 3, wherein the leg sections of each of the U-shaped bar members comprises an inward extension facing each other and rotatably received within corresponding holes formed on the basket so as to allow the basket to be supported on the leg sections in a relatively rotatable manner.

5. The deep fryer structure as claimed in claim 2, wherein the inner end of the handle comprises two spaced side walls each having an arc slot formed thereon to be substantially opposite to each other for movably receiving the end pin therein.

6. The deep fryer structure as claimed in claim 1, wherein the top rim of the body comprises two slots extending from the recess in opposite directions and wherein the base member comprises two opposite sideways lugs to be respectively received within the slots of the top rims so as to securely hold the base member on the top rim of the body.

* * * * *